United States Patent [19]
Kawamoto et al.

[11] Patent Number: 5,488,279
[45] Date of Patent: Jan. 30, 1996

[54] DUAL POWER REFRIGERATOR

[75] Inventors: Takato Kawamoto; Makoto Gezima; Eiichi Furuse, all of Gunma, Japan

[73] Assignee: Sawafuji Electric Co., Ltd., Tokyo, Japan

[21] Appl. No.: 174,164

[22] Filed: Dec. 27, 1993

Related U.S. Application Data

[63] Continuation of Ser. No. 812,710, Dec. 23, 1991, abandoned.

[30] Foreign Application Priority Data

Dec. 28, 1990 [JP] Japan .................. 2-416906
Apr. 12, 1991 [JP] Japan .................. 3-79664

[51] Int. Cl.$^6$ .................. H02S 9/00; H02P 1/00
[52] U.S. Cl. .................. 318/801; 318/442; 307/64; 62/236
[58] Field of Search .................. 318/771, 773, 318/778, 772, 799–812, 685, 696, 421, 440–442; 363/50, 37; 307/64–69; 62/3, 61, 134, 228.1, 236

[56] References Cited

U.S. PATENT DOCUMENTS

| | | | |
|---|---|---|---|
| Re. 28,618 | 11/1975 | Fiocca | 328/138 |
| 3,665,284 | 5/1972 | Loyzim | 318/696 |
| 3,974,660 | 8/1976 | Farr | 307/66 X |
| 4,028,593 | 6/1977 | Newell | 318/481 |
| 4,216,385 | 8/1980 | Omura et al. | 307/64 |
| 4,319,177 | 3/1982 | Kawada et al. | 318/811 X |
| 4,652,801 | 3/1987 | Burdett | 318/481 |
| 4,672,228 | 6/1987 | Swobda | 307/66 |
| 4,885,521 | 12/1989 | Crampton | 307/66 X |
| 4,916,378 | 4/1990 | Kume et al. | 318/808 |
| 4,934,158 | 6/1990 | Sakano | 62/239 |
| 4,982,149 | 1/1991 | Shimanuki | 307/64 X |
| 5,017,800 | 5/1991 | Divan | 307/66 |
| 5,049,800 | 9/1991 | Kohari et al. | 318/778 X |
| 5,056,330 | 10/1991 | Isobe et al. | 62/236 |
| 5,058,710 | 10/1991 | Iwasa | 318/807 X |
| 5,070,291 | 12/1991 | Nakamura et al. | 318/778 X |

*Primary Examiner*—Jonathan Wysocki
*Attorney, Agent, or Firm*—McGlew and Tuttle

[57] ABSTRACT

A rotary-compressor control system for electric refrigerators using rotary compressors for cooling the inside of the refrigerators, in which a battery for feeding direct-current power, an inverter power section for converting direct-current (d-c) power from the battery into a low-voltage three-phase alternating-current (a-c) voltage, a low-voltage three-phase induction motor for driving the rotary compressor with the low-voltage three-phase a-c power obtained in the inverter power section, and a control circuit for controlling the inverter power section on the basis of a control command signal given from the outside, so that the rotary compressor is driven by the three-phase induction motor that operates with a low voltage of the order of battery voltage.

9 Claims, 9 Drawing Sheets

DUAL POWER REFRIGERATOR

This is a continuation of application Ser. No. 07/812,710 filed Dec. 23, 1991 now abandoned.

BACKGROUND OF THE INVENTION

Conventional types of electric refrigerators working off a battery incorporated in an automobile, for example, typically use reciprocating compressors to cool the inside of the refrigerators. In cases where refrigerators are carried about by automobiles or with auto refrigerators, the container or housing of which is constructed and used as a refrigerator, the need for reducing the size and weight of the refrigerating unit has been keenly felt. It is for this reason that the demand for a refrigerator using rotary compressors is increasing because the rotary compressor lends itself to reducing the size and weight of the refrigerating unit.

There also is a need for an a-c/d-c refrigerator which works off the battery while it is carried along on the automoile, and operates from the commercial a-c line when the automobile stops at the destination.

SUMMARY OF THE INVENTION

This invention is intended to solve the aforementioned problems.

It is an object of this invention to make it possible to drive a refrigerator compressor by a low-voltage three-phase induction motor that operates with a low voltage of the order of the voltage of a battery mounted on an automobile.

It is another object of this invention to make possible to drive a refrigerator compressor by a three-phase induction motor by boosting the voltage of a battery mounted on an automobile to the voltage of the commercial a-c line.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

Figure 1:
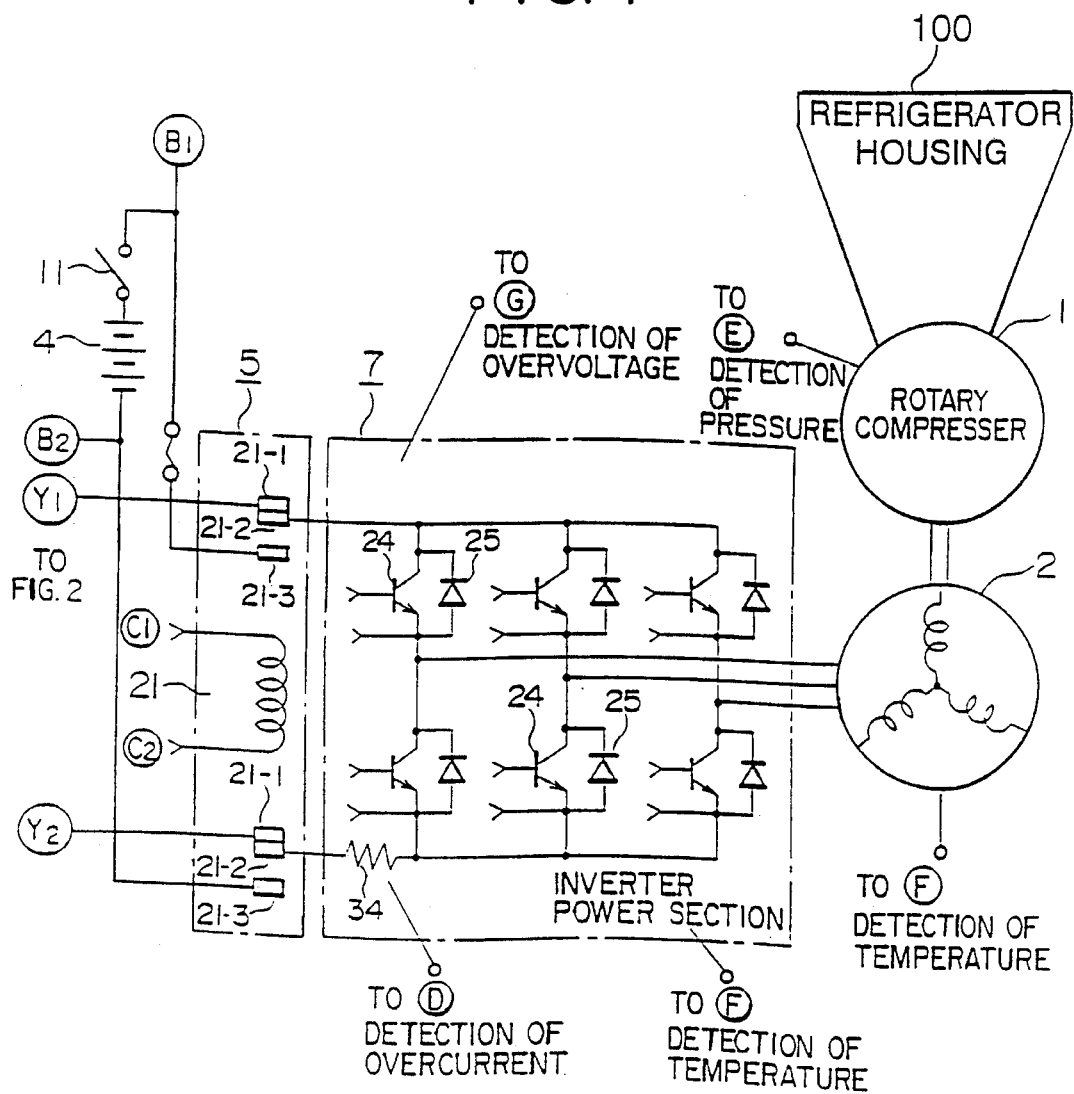
FIG. 1 shows part of a rotary-compressor control system embodying this invention.
Figure 2:
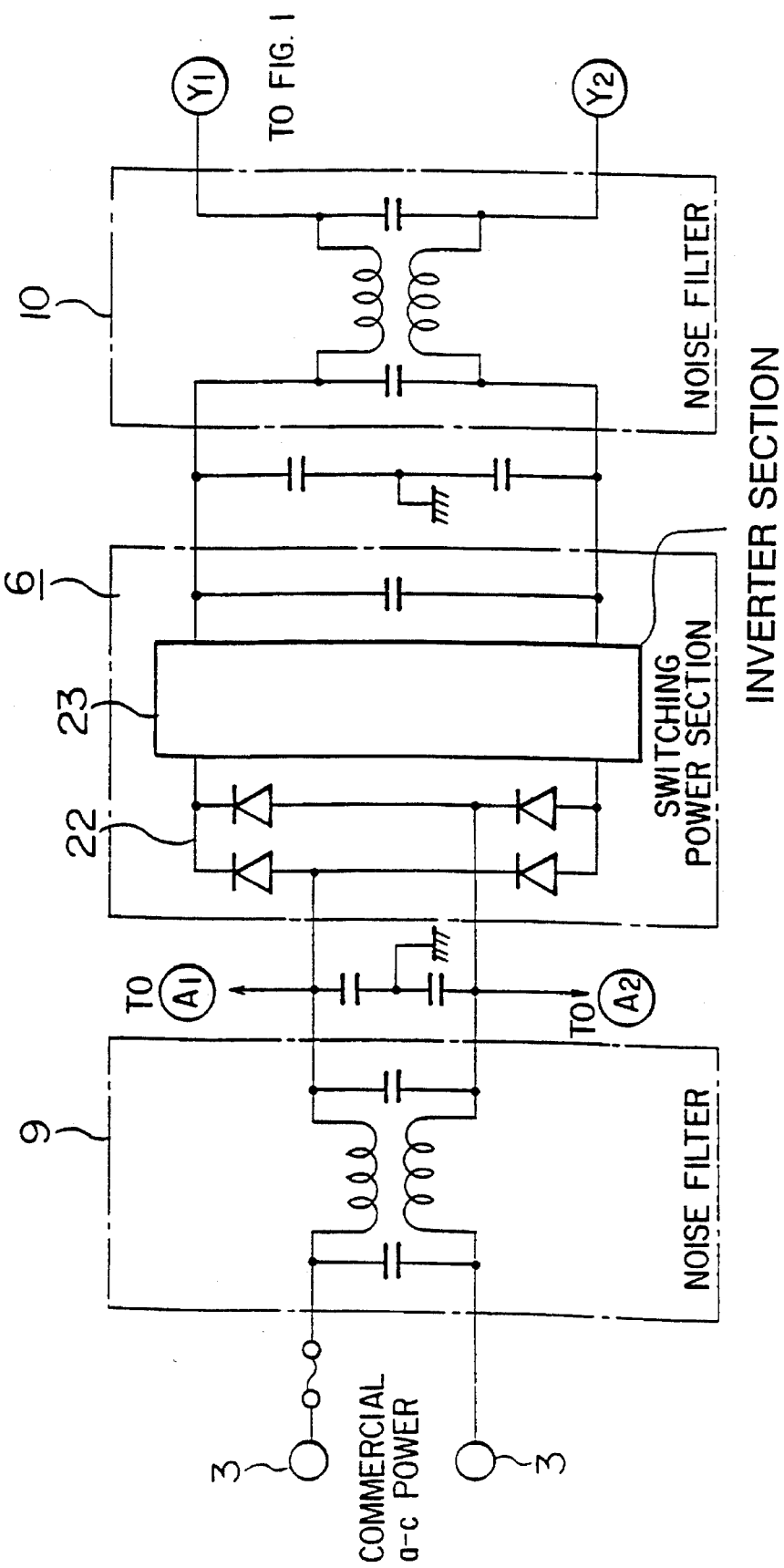
FIG. 2 shows part of an embodiment in combination with FIG. 1.
Figure 3:
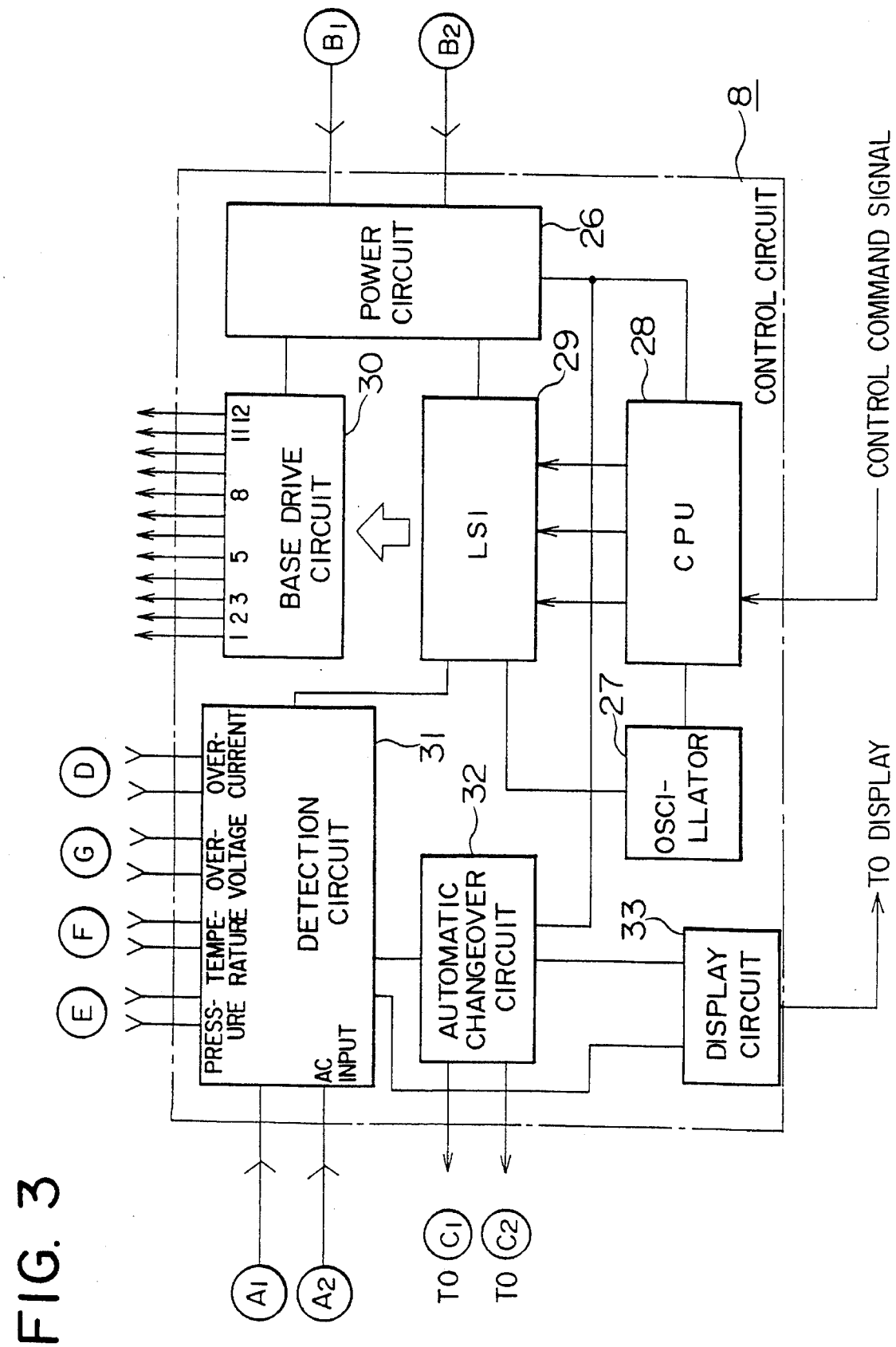
FIG. 3 shows part of an embodiment in combination with FIGS. 1 and 2.

DETAILED DESCRIPTION OF THE EMBODIMENTS:

FIGS. 1 through 3 form in combination a drawing showing a rotary-compressor control system for electric refrigerators. (A), (B), - - - (G) and (Y) shown in FIGS. 1 and 2 are connected electrically to (A), (B), - - - (G) and (Y) shown in FIG. 3.

In the figures, numeral 1 denotes a rotary compressor which lends itself to reducing the size and weight of an auto refrigerator. The rotary compressor 1 cools the refrigerator housing 100.

The rotary compressor 1 is driven by a low-voltage three-phase induction motor 2 designed to be operated with a low-voltage three-phase alternating-current (a-c) voltage of a voltage lower than 100 V. The low-voltage three-phase induction motor 2 is of an a-c/d-c Striven type in which either a 12-V or 24-V battery mounted on an automobile, or a direct-current (d-c) power of the same voltage level obtained by rectifying the commercial a-c power connected to a terminal 3 shown in FIG. 2 can be used as a power source through a changeover arrangement.

The electric refrigerator having the above-mentioned type of power source operates with the d-c voltage of a battery 4 while it is carried along on the automobile, and operates with a d-c voltage obtained from the commercial a-c line when the automoile stops at a place where commercial power is available.

The a-c/d-c power source is such that the d-c voltage obtained by rectifying the commercial a-c power connected to the terminal 3 and the d-c voltage from the battery 4 can be changed over by an automatic changeover device 5 shown in FIG. 1. That is, the a-c/d-c power source has such a construction that when the commercial a-c power is connected to the terminal 3, a relay 21 shown in FIG. 1 is actuated by an automatic changeover circuit 32 shown in FIG. 3 to cause the d-c voltage on the commercial a-c power side to take preference over the d-c voltage on the side of the battery 4 to drive the low-voltage three-phase induction motor 2.

A switching power section 6 shown in FIG. 2 has a rectifier section 22 and an inverter section 23. The commercial a-c power voltage connected to the terminal 3 is converted into a d-c voltage in the rectifier section 22, and the converted d-c high voltage is converted into a low voltage in the inverter section 23. By connecting relay contacts 21-2 and 21-3 of the automatic changeover device 5, a d-c voltage of the same voltage as that of the battery 4 is produced. That is, when the voltage of the battery 4 mounted on the automobile is 12 V, a 12-V d-c voltage is output by the inverter section 23. When the voltage of the battery 4 is 24 V, then a 24-V d-c voltage is output by the inverter section 23. Consequently, almost the same d-c voltage can be supplied to the inverter power section 7 when the automatic changeover device 5 automatically changes over either the d-c voltage on the commercial a-c power side or the d-c voltage on the side of the battery 4.

The inverter power section 7 shown in FIG. 1 is a control circuit that feeds to the low-voltage three-phase induction motor 2 a 12-V or 24-V low-voltage three-phase a-c voltage, depending on the battery voltage. For example, the inverter power section 7 consists of six transistors 24 and six diodes 25, and effects the control of the revolution of the low-voltage three-phase induction motor 2 by appropriately applying a control signal from a control circuit 8, which will be described later, to these transistors 24.

The control circuit 8 shown in FIG. 3 consists of a power circuit 26, an oscillator 27, a CPU 28, an LSI 29, a base drive circuit 30, a detection circuit 31, an automatic changeover circuit 32 and a display circuit 33. The control circuit 8 of this construction receives power from the power circuit 26 to operate each circuit in accordance with timing pulses generated in the oscillator 27. The CPU 28 and the LSI 29 generate in combination a pseudo sine wave, and effect the control to efficiently operate the rotary compressor 1 through V-F control on the basis of voltage V and frequency F, and PWM control, etc. in accordance with rapid-cooling and other control command signals input to the CPU 28 from the outside operator, or detection signals detected by the detection circuit 31.

These control signals are fed to each transistor 24 in the inverter power section 7 via the base drive circuit 30. The detection circuit 31 receives detection signals from sensors provided in various circuit sections, such as a pressure detection signal from the rotary compressor 1, and a temperature detection signal from the low-voltage three-phase induction motor 2 or the inverter power section 7. The detection circuit 31 outputs to the LSI 29 the V-F and PWM control signals required for operating the rotary compressor 1 in the optimum conditions on the basis of the aforementioned detection signals. The detection circuit 31 outputs to the LSI 29 the control signals for preventing overvoltage and overcurrent from flowing in the inverter power section 7 as the detection circuit 31 receives an overvoltage detection signal detected when overvoltage is accidentally applied to the inverter power section 7, or an overcurrent detection signal in the inverter power section 7 detected by a resistor 34. In addition, the detection circuit 31 outputs to the automatic changeover circuit 32 a signal for switching to the d-c voltage on the commercial a-c power side when the detection circuit 31 receives an a-c detection signal detecting the application of the commercial a-c power to the terminal 3. When the automatic changeover circuit 32 receives from the detection circuit 31 a signal for changing to the d-c voltage on the commercial a-c power side, the automatic changeover circuit 32 is actuated immediately so that the common contact 21-2 is changed to the side of the relay contact 21-1 via the relay 21.

The display circuit 33 outputs a signal for displaying on the display the type of the drive power being used, the presence/absence of abnormalities in various circuit sections, etc. on the basis of detection signals input to the detection circuit 31.

Numerals 9 and 10 shown in FIG. 2 denote noise filters; the noise filter 9 is used for the a-c line, and the noise-filter 10 for the d-c line.

In an electric refrigerator having a rotary-compressor control system of this construction, drive power is supplied from the battery 4 mounted on an automobile, for example, when the refrigerator is carried by the automobile. That is, the common contact 21-2 of the automatic changeover device 5 makes contact with the relay contact 21-3 at this time to feed the 12-V or 24-V d-c voltage from the battery 4 to the inverter power section 7 via the switch 11.

When a control signal from the base drive circuit 30 is applied to the base of each transistor 24, the inverter power section 7 is controlled so as to operate the rotary compressor 1 in the optimum conditions. When the voltage of the battery 4 is 12 V, the inverter power section 7 generates a 12-V low-voltage three-phase a-c voltage, and when the voltage of the battery 4 is 24 V, the inverter power section 7 generates a 24-V low-voltage three-phase a-c voltage to drive the low-voltage three-phase induction motor 2. Needless to say, the three-phase induction motor 2 is designed so as to operated with a 12-V 24-V three-phase a-c voltage.

When the automobile on which the electric refrigerator mounted arrives at a location where commercial a-c power available, the terminal 3 is connected to the commercial a-c power line. The detection circuit 31 detects a connection of the terminal 3 with the commercial a-c power line, and effects power changeover by connecting the common contact 21-2 of the automatic changeover device 5 with the relay contact 21-1 via the automatic changeover circuit 32. That is, a d-c voltage having the same voltage as that of the battery 4 on the side of the commercial a-c power line is supplied to the inverter power section 7 in preference to the d-c voltage on the side of the battery 4. At this time, a signal indicating the presence of the commercial a-c power is sent from the display circuit 33 to the display, which in turn displays the presence of the commercial a-c power.

The operation of the control circuit 8 is the same as in the case where the d-c power of the battery 4 is used. That is, a control signal for operating the rotary compressor 1 in the optimum conditions is output from the base drive circuit 30 to the inverter power section 7.

If the detection circuit 31 detects an abnormality, such as overvoltage applied to the inverter power section 7, or overcurrent, the supply of the control signal from the control circuit 8 to the inverter power section 7 is prevented for system protection.

When starting the rotary compressor 1, a control signal for smoothly operating the low-voltage three-phase induction motor 2 through PWM control is fed from the control circuit 8 to the inverter power section 7. This permits the rotary compressor 1 to be started up smoothly, resulting in small starting current. This also helps protect the battery 4 when the compressor 1 is driven by the battery 4.

The significance of the use of a low-voltage three-phase induction motor 2 driven with a battery voltage of 12 V or 24 V lies in that the level of the starting current, which tends to be unwantedly high with the induction motor, can be reduced through the control of the inverter power section 7 by effecting PWM control or V-F control, or combining the motor 2 with the inverter power section 7 capable of producing low-voltage three-phase a-c voltage. Thus, the capacity of each transistor 24 constituting the inverter power section 7 can be reduced. Furthermore, since the voltage of the battery 4 is supplied to the inverter power section 7 as it is, without boosting the voltage in a transformer, etc. to drive the low-voltage three-phase induction motor 2 through PWM control or V-F control, a number of advantages can be realized. Some advantages the optimum control of the rotary compressor 1 in accordance with the state of load, and the operation of the compressor 1 with high efficiency.

In addition, providing the changeover function of the connection of the low-voltage three-phase induction motor 2 from the delta connection to the Y one, or vice versa permits the rotary compressor 1 to be operated with the 12-V or 24-V power of the battery 4.

Figure 4:
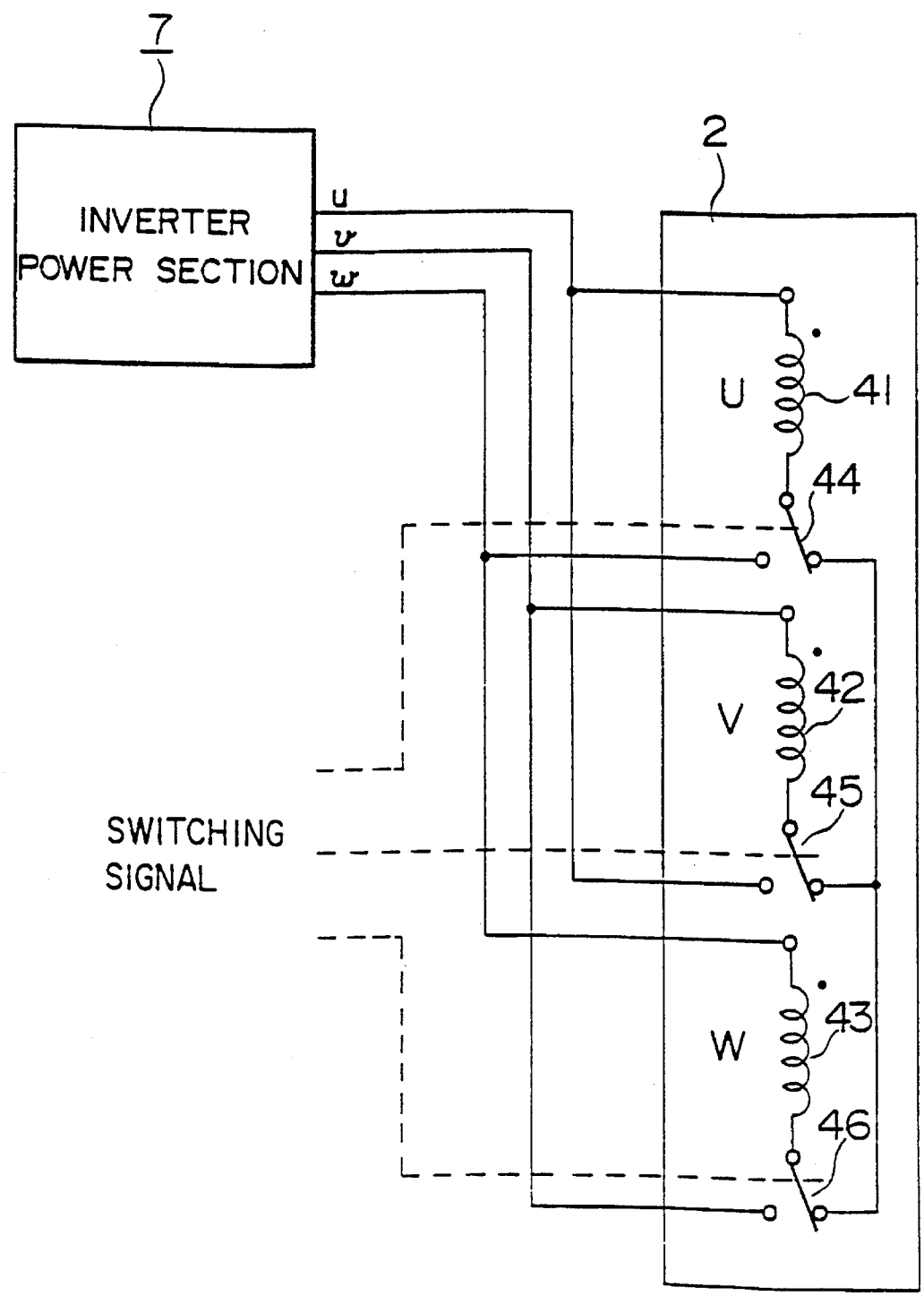
FIG. 4 is a diagram of assistance in explaining the changeover of connections in a three-phase induction motor.

FIG. 4 illustrates the state of changeover of motor connection. In the figure, changeover switches 44 through 46 are connected in the Y connection. The motor connection can be connected in the Y connection by simultaneously changing over the changeover switches 44 through 46 with a switching signal. Since the inverter power section 7 produces a 12-V three-phase a-c voltage when the voltage of the battery 4 is 12 V, the motor 2 is operated in the delta connection, whereas the motor 2 is operated in the Y connection because the inverter power section 7 produces a 24-V three-phase a-c voltage when the voltage of the battery 4 is 24 V.

By changing the connection of the low-voltage three-phase induction motor 2 in this way, the rotary compressor 1 can be driven by battery 4 of different voltages. The optimum control of the low-voltage three-phase induction motor 2 connected either in the Y connection or in the delta connection can be accomplished with a control signal based on PWM or V-F control output from the control circuit 8.

The changeover switches 44 through 46 may be replaced with relays, switching elements, such as FET transistors and thyristors, to implement automatic changeover. The connection of the low-voltage three-phase induction motor 2 can be changed with plugs on the side of the motor 2.

Figure 5:
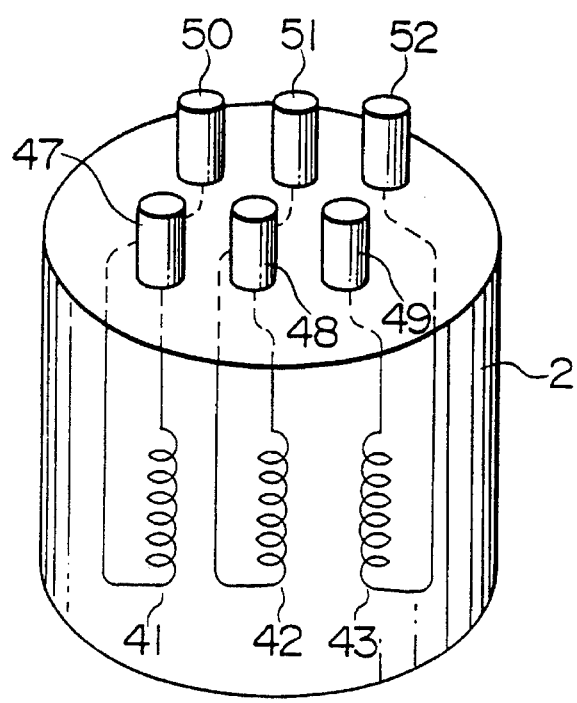
FIG. 5 is a diagram illustrating the terminals of the three-phase induction motor for changing over connections using plugs.
Figure 6:
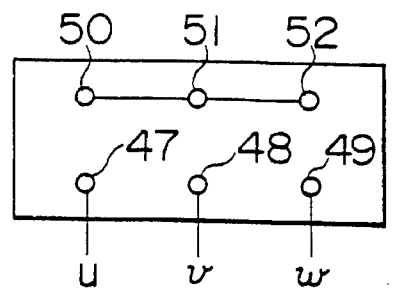
FIG. 6 is a diagram illustrating a delta connection using plugs.
Figure 7:
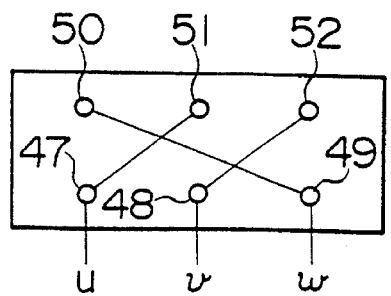
FIG. 7 is a diagram illustrating a Y connection using plugs.

FIG. 5 is a diagram of assistance in explaining the terminals of the low-voltage three-phase induction motor whose connection is changed with plugs. When the low-voltage three-phase induction motor 2 is driven by a 24-V battery 4, terminals 50 through 52 are connected in the Y connection, as shown in FIG. 6. When the motor 2 is driven by a 12-V battery 4, on the other hand, the delta connection is formed by connecting the terminals 47 and 51, the terminals 48 and 52, and the terminals 49 and 50, as shown in FIG. 7.

Next, another embodiment of this invention will be described, referring to FIGS. 8 through 11.

Figure 8:
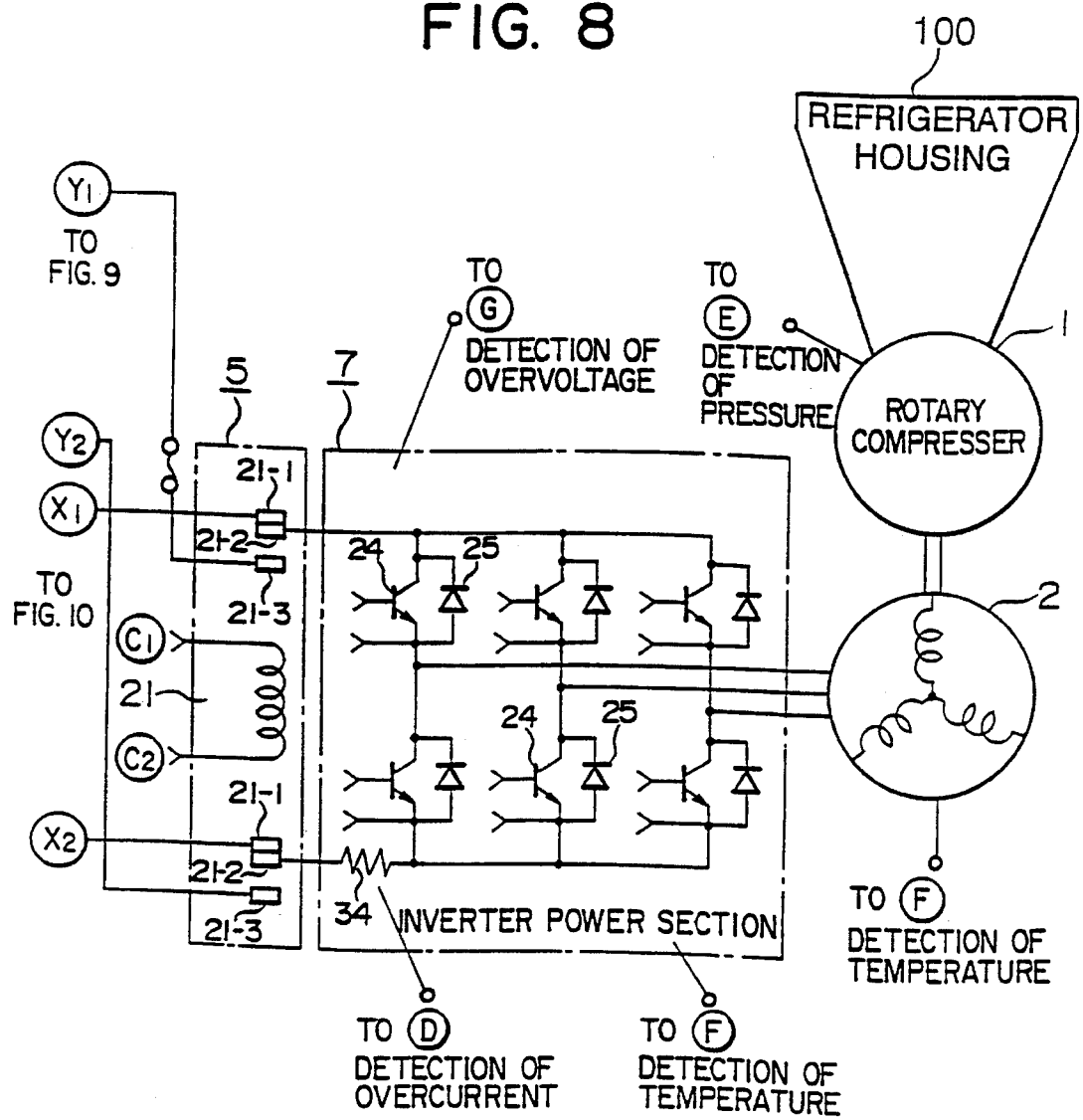
FIG. 8 is a diagram illustrating the construction of another embodiment of a rotary-compressor control system according to this invention.
Figure 9:
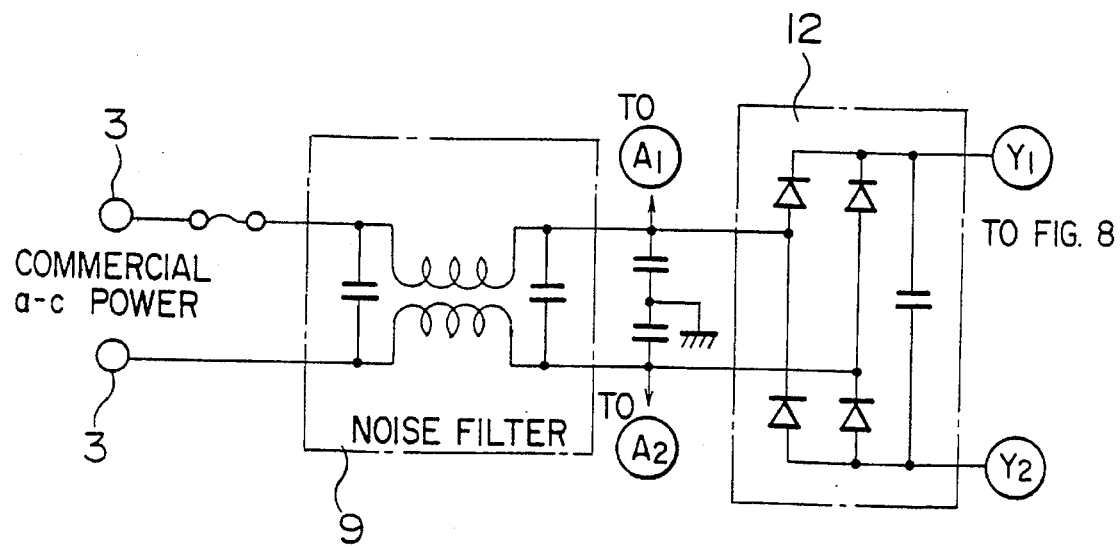
FIG. 9 shows part of an embodiment in combination with FIG. 8.
Figure 10:
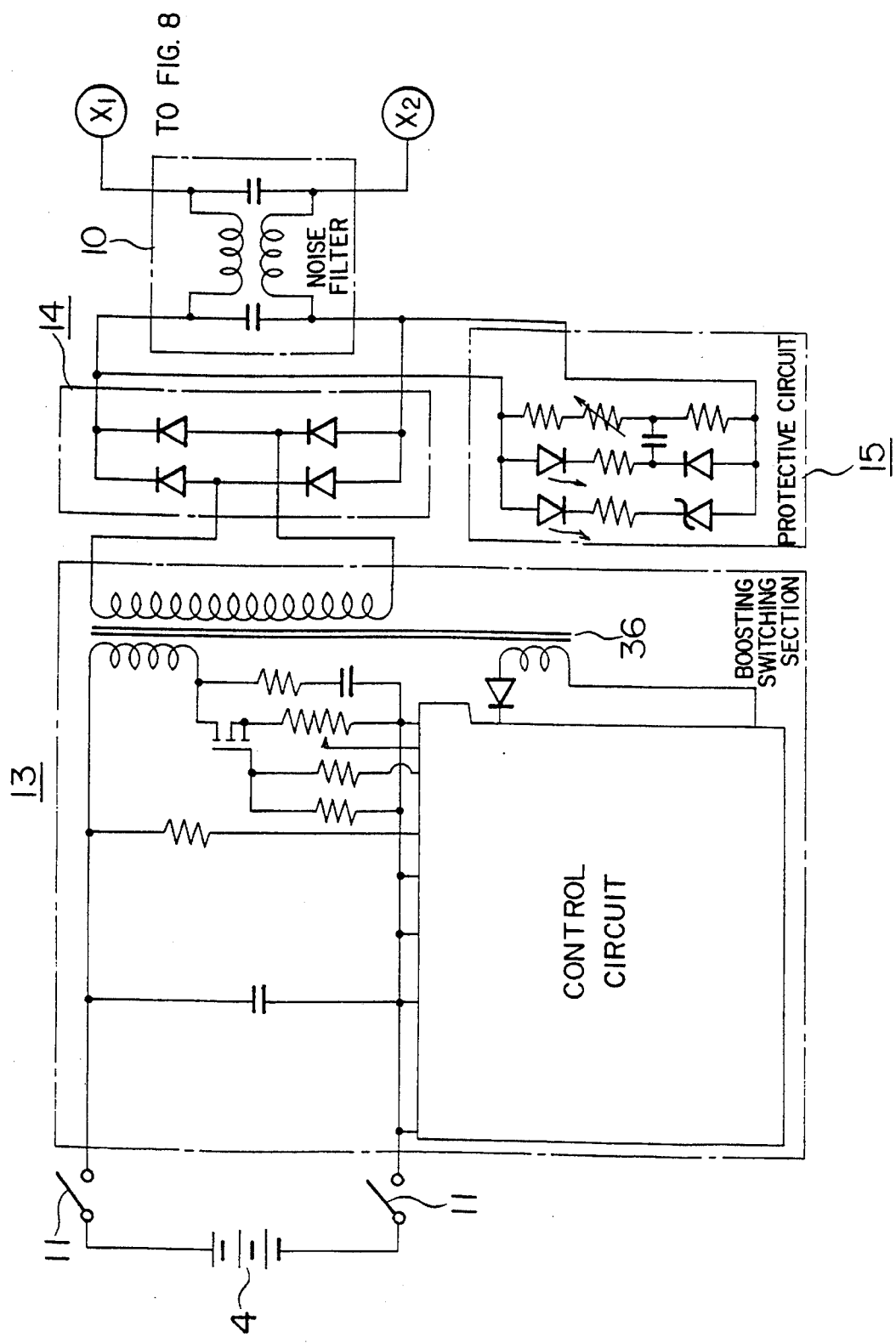
FIG. 10 shows part of an embodiment in combination with FIG. 8.
Figure 11:
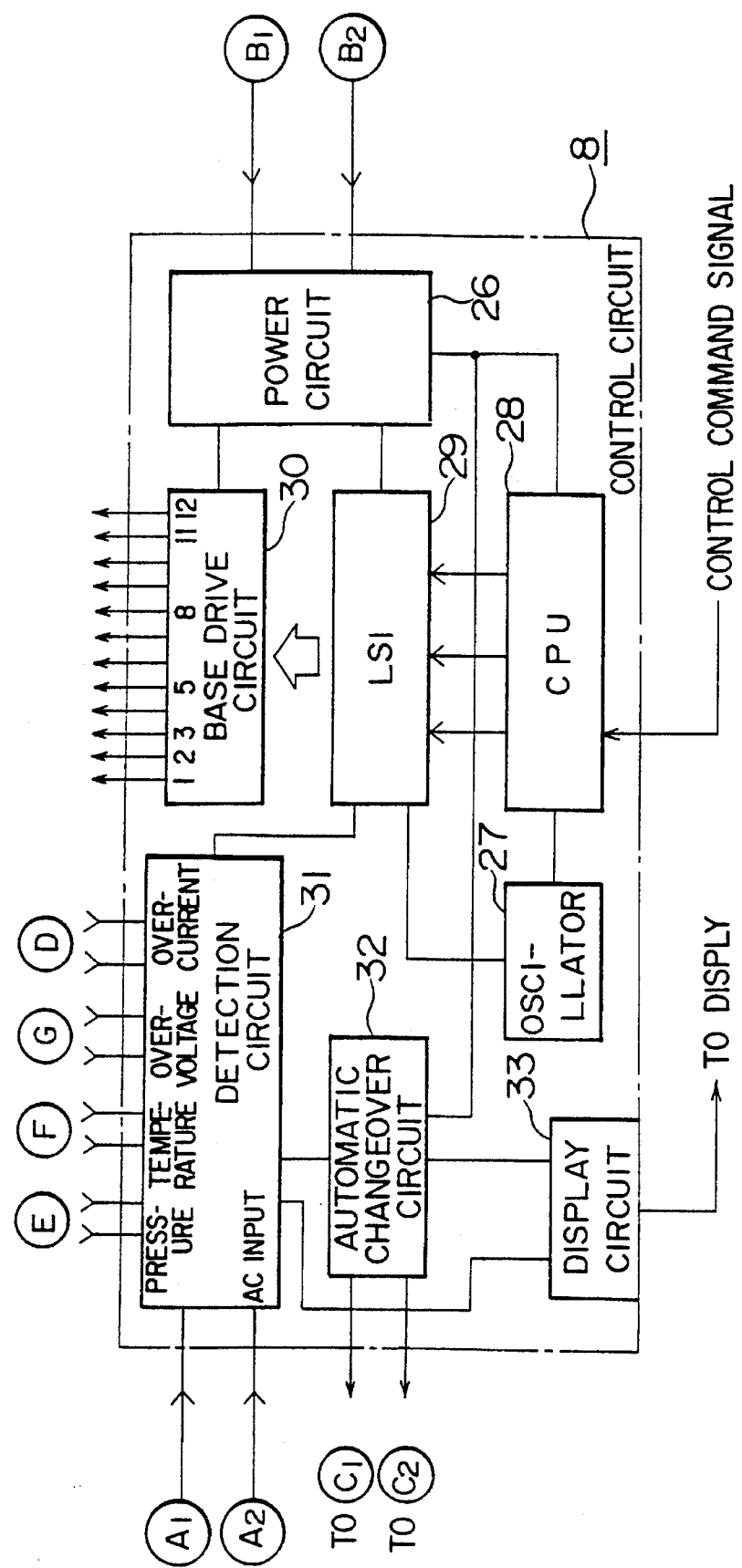
FIG. 11 shows part of an embodiment in combination with FIGS. 8 and 9.

FIGS. 8 through 11 constitute one figure in combination, illustrating another embodiment of the rotary-compressor control system of this invention. The same parts as shown FIGS. 1 through 3 are indicated by the same numerals throughout. The relative positions of the figures are as follows; FIGS. 9 and 10 are connected to the left of FIG. 8, and FIG. 9 is located at the top of FIG. 10. (A), (B), - - - (G), (X) and (Y) in FIGS. 9 through 10 are connected electrically to (A), (B), - - - (G), (X) and (Y) in FIG. 11. A general-purpose mass-produced inexpensive motor of high-voltage (100 V and 200 V) specifications, such as a three-phase a-c induction motor, is used as a motor 2 for driving the rotary compressor 1.

Based on the fact that the use of a motor 2 of a design involving high voltages is economically favorable because an inexpensive general-purpose motor can be used as the motor 2, the embodiment shown in FIG. 8 employs a motor involving high voltages.

A rectifying circuit 12 converts the commercial a-c power connected to a terminal 3 into a d-c voltage which is in turn applied to a relay contact 21-3 of an automatic changeover device 5.

A boosting switching section 13 subjects the d-c voltage of a battery 4 to high-frequency oscillation with an oscillating IC, and raises the voltage with a high-frequency boosting transformer 36 to generate a high high-frequency voltage.

A rectifying section 14 rectifies the high high-frequency voltage generated in the boosting switching section 13 into a d-c voltage, which is applied to a relay contact 21-1 of the automatic changeover device 5. The d-c voltage applied to the relay contact 21-1 is adjusted in the boosting switching section 13 so as to become equal to the d-c voltage obtained from the commercial a-c power that is applied to the relay contact 21-3. Consequently, almost constant voltage is supplied to the inverter power section 7 even when the d-c voltage on the side of the commercial a-c power connected to the terminal 3 is changed to the d-c voltage of the battery 4 by the automatic changeover device 5.

Numeral 15 indicates a protective circuit that protects the boosting switching section 13 by detecting an abnormal state, such as overvoltage or overcurrent accidentally caused in the boosting switching section 13, and stopping the oscillation of the oscillating IC via a phototransistor.

Since the operation of the embodiment shown in FIGS. 8 through 11 having the aforementioned construction is essentially the same as that of the embodiment shown in FIGS. 1 through 3 except that the d-c power supplied to the inverter power section 7 is set to a higher level than that of the embodiment shown in FIGS. 1 through 3 to obtain good torque performance with the motor 2, as described above, description of the operation of the embodiment shown in FIGS. 8 through 11 is omitted.

The embodiment shown in FIGS. 8 through 11 can use commercial a-c power merely by rectifying it in the rectifying circuit 12, and the rectified d-c voltage is oscillated into high frequency and the resulting high frequency is boosted on the side of the battery 4. This leads to a reduction in the size of the transformer and in the size of the entire system. In addition, by adjusting the three-phase a-c voltage fed to the motor 2 to 100 V or 200 V, commercially available general-purpose three-phase motor can be used.

As described above, this invention, which relies on a rotary compressor for refrigeration, makes it possible to reduce the size and weight of the refrigerating unit and drive the refrigerator either with a-c or d-c using an automatic changeover device.

Furthermore, this invention allows the refrigerator to be powered by the commercial a-c power at locations where commercial a-c power is available, preventing the battery from being unwantedly discharged.

A soft start of the refrigerator can be realized through PWM control using a control circuit.

While specific embodiments of the invention have been shown and described in detail to illustrate the application of the principles of the invention, it will be understood that the invention may be embodied otherwise without departing from such principles.

What is claimed is:

1. A rotary-compressor control system for electric refrigerators having rotary compressors to cool the inside of the electric refrigerator, characterized in that said rotary-compressor control system comprises a battery for supplying a battery voltage less than or equal to approximately 24 volts, a switching power section having a rectifying section and an inverter section for rectifying commercial a-c power with said rectifying section, reducing a voltage of said commercial a-c power to a substantially same voltage of said battery in said inverter section, an automatic changeover means for changing over from d-c voltage from said battery to d-c voltage from said switching power section and vice versa, an inverter power section receiving d-c power supplied from said battery or said switching power section via said automatic changeover means and converting said d-c power into a three-phase a-c voltage, a three-phase induction motor for driving said rotary compressor with said three-phase a-c voltage generated in said inverter power section;

control means for changing said automatic changeover means preferentially to the side of said switching power section when commercial a-c power is used, and producing a control signal for controlling said inverter power section on the basis of a pressure detection signal provided from the rotary compressor; said rotary compressor being driven by said three-phase induction motor operating with a motor voltage having a magnitude substantially similar to said battery voltage;

a delta-Y connection changing means for changing over a connection of said three-phase induction motor from a delta connection to a Y connection and vice versa, said changing means causing said three-phase induction motor to be driven in the delta connection when battery voltage is approximately 12 V, and in the Y connection when battery voltage is approximately 24 V.

2. A rotary-compressor control system for electric refrigerators having motor-driven rotary compressors to cool the inside of the electric refrigerator, characterized in that said rotary-compressor control system comprising a battery for supplying a battery voltage not higher than 24 volts, a switching power section having a rectifying section and an inverter section for rectifying commercial a-c power in said rectifying section, and changing a voltage of said commercial a-c power to a magnitude of said battery voltage in said inverter section;

an inverter power section receiving d-c power supplied from said battery or said switching power section via an automatic changeover means and converting said d-c power into a three-phase a-c voltage to feed to said motor that drives said rotary compressor;

control means for changing said automatic changeover means preferentially to the side of said switching power section when commercial a-c power is used, producing an optimal control signal fed to said inverter power section on the basis of a pressure detection signal from said rotary compressor, and generating an alarm signal when said pressure detection signal indicates an abnormal state of said rotary compressor; and a delta-Y changing means for changing over a configuration of said three-phase induction motor from a delta configuration to a Y configuration and vice versa is provided, said changing means causing said three-phase induction motor to be driven in said delta configuration when battery voltage is 12 V, and in said Y configuration when battery voltage is 24 V.

3. A dual power refrigerator comprising:

a refrigerator housing;

a rotary compressor connected to said refrigerator housing and for cooling said refrigerator housing;

a three-phase induction motor connected to said rotary compressor and rotating said rotary compressor to perform said cooling;

power inverter means for receiving d-c power and converting said d-c power into three-phase power supplied to said induction motor at a motor voltage, said d-c power being at a voltage substantially similar to said motor voltage;

changeover means for changing between a first and second source of said d-c power to said power inverter means;

battery terminal means connected to said first source of said change over means and for receiving battery d-c power at one of first and second battery voltages, said second battery voltage being substantially twice said first battery voltage said motor voltage being substantially similar to said one of said battery voltages;

commercial a-c power means connected to said second source of said changeover means and for receiving commercial a-c power at a voltage larger than said first and second battery voltages, said commercial a-c power means rectifying and lowering said commercial a-c power to a magnitude of one of said first and second battery voltages;

control means connected to said commercial a-c power means and said changeover means to change said changeover means to said second source when said commercial a-c power means is receiving said commercial power, said control means also connected to said power inverter means and receiving an external control command signal from an operator for controlling said power inverter section; and delta-Y changing means connected between said power inverter means and said three-phase induction motor, and for changing a configuration of said three-phase induction motor between a Y configuration of said three-phase induction motor between a Y configuration and a delta configuration, said delta-Y changing means connecting said three-phase induction motor in said delta configuration when said first battery voltage is received, said delta-Y changing means connecting said three-phase induction motor in said Y configuration when said second battery voltage is received.

4. A refrigerator in accordance with claim 3, wherein:

said control means includes a detection means for detecting pressure in said rotary compressor, for detecting temperature of said power inverter means and three-phase induction motor, and for detecting voltage and current in said power inverter means, said control means controlling said power inverter means in response to said detecting, said control means also including a display means for displaying a status of the dual power refrigerator.

5. A refrigerator in accordance with claim 3, wherein:

said battery voltage is less than or equal to 24 volts.

6. A refrigerator in accordance with claim 3, wherein:

said commercial power means first rectifies the commercial a-c power and then reduces the rectified commercial a-c power to said battery voltage.

7. A refrigerator in accordance with one of claims 1, 2, and 3, wherein:

said changeover means and said control means supply said power inverter with only said commercial a-c power when said commercial a-c power means is receiving said commercial a-c power.

8. A refrigerator in accordance with claim 7, wherein:

said first voltage level is substantially 12 volts and said second voltage level is substantially 24 volts.

9. A method for operating a multi power refrigerator comprising:

providing a refrigerator housing;

providing a rotary compressor connected to said refrigerator housing and for cooling said refrigerator housing;

providing a three-phase induction motor connected to said rotary compressor and rotating said rotary compressor to perform said cooling;

providing power inverter means for receiving d-c power and converting said d-c power into three-phase power supplied to said induction motor at a motor voltage, said d-c power being at a voltage substantially similar to said motor voltage;

providing changeover means for changing between a first and second source of said d-c power to said power inverter means;

providing battery terminal means connected to said first source of said change over means and for receiving battery d-c power at a one of a first and second battery voltage, said second battery voltage being substantially twice said first battery voltage, said motor voltage substantially following said battery voltage;

providing commercial a-c power means connected to said second source of said changeover means and for receiving commercial a-c power at a voltage larger than said first and second battery voltages, said commercial a-c power means rectifying and lowering said commercial a-c power to a magnitude of one of said first and second battery voltages;

providing control means connected to said commercial a-c power means and said changeover means to change said changeover means to said second source when said commercial a-c power means is receiving said commercial power, said control means also connected to said power inverter means and receiving an external control command signal from an operator for controlling said power inverter section;

providing delta-Y changing means connected between said power inverter means and said three-phase induction motor, and for changing a configuration of said three-phase induction motor between a Y configuration and a delta configuration;

changing said configuration of said three-phase induction motor to said delta configuration when said first battery voltage is received;

changing said configuration of said three-phase induction motor to said Y configuration when said second battery voltage is received.

* * * * *